US008968635B2

(12) United States Patent
Aoki et al.

(10) Patent No.: US 8,968,635 B2
(45) Date of Patent: Mar. 3, 2015

(54) PREFORM FOR LARGE CONTAINER, LARGE CONTAINER, AND METHOD FOR PRODUCING LARGE CONTAINER

(75) Inventors: Daiichi Aoki, Nagano (JP); Hiroyuki Tsukamoto, Nagano (JP)

(73) Assignee: Nissei ASB Machine Co., Ltd., Nagano (JP)

( * ) Notice: Subject to any disclaimer, the term of this patent is extended or adjusted under 35 U.S.C. 154(b) by 0 days.

(21) Appl. No.: 13/518,891

(22) Filed: Jun. 24, 2012

(65) Prior Publication Data

US 2013/0037507 A1 Feb. 14, 2013

Related U.S. Application Data

(63) Continuation of application No. PCT/JP2010/072875, filed on Dec. 20, 2010.

(30) Foreign Application Priority Data

Dec. 25, 2009 (JP) .................................. 2009-296196

(51) Int. Cl.
| | |
|---|---|
| B29C 49/06 | (2006.01) |
| B29C 49/64 | (2006.01) |
| B29C 49/18 | (2006.01) |
| B29L 31/00 | (2006.01) |
| B29C 49/12 | (2006.01) |

(52) U.S. Cl.
CPC ............. B29C 49/649 (2013.01); B29C 49/185 (2013.01); *B29C 49/06* (2013.01); *B29L 2031/7126* (2013.01); *B29L 2031/7158* (2013.01); *B29C 49/12* (2013.01); *B29B 2911/14593* (2013.01); *B29B 2911/1498* (2013.01)
USPC ............ 264/529; 264/523; 264/535; 264/537

(58) Field of Classification Search
None
See application file for complete search history.

(56) References Cited

U.S. PATENT DOCUMENTS

| | | | | |
|---|---|---|---|---|
| 4,414,175 A * | 11/1983 | Rainville | | 264/531 |
| 4,467,929 A | 8/1984 | Jakobsen et al. | | |
| 4,836,971 A | 6/1989 | Denis et al. | | |
| 5,975,880 A | 11/1999 | Takada et al. | | |
| 6,080,353 A | 6/2000 | Tsuchiya | | |
| 6,089,854 A * | 7/2000 | Outreman et al. | ............ | 425/526 |
| 7,316,798 B2 * | 1/2008 | Uesugi et al. | ................ | 264/530 |
| 8,440,131 B2 * | 5/2013 | Ishii et al. | ................ | 264/537 |

FOREIGN PATENT DOCUMENTS

| | | |
|---|---|---|
| JP | 03-205124 | 9/1991 |
| JP | 06-143392 | 5/1994 |
| JP | 08-090642 | 4/1996 |
| JP | 11-034152 | 2/1999 |
| JP | H1134152 A | 2/1999 |
| WO | WO 2009/095109 A2 | 8/2009 |

* cited by examiner

*Primary Examiner* — Monica Huson
(74) *Attorney, Agent, or Firm* — David L. Hoffman; Hoffman Patent Group

(57) ABSTRACT

A preform 20 for a large container, used for producing a large container which is made of a polyethylene terephthalate resin and which is formed by stretch blow molding, is formed by injecting molding to have a wall thickness of 6 mm to 9 mm and have a longitudinal axis length longer than that of the large container which is a final molded product.

13 Claims, 6 Drawing Sheets

PREFORM FOR LARGE CONTAINER, LARGE CONTAINER, AND METHOD FOR PRODUCING LARGE CONTAINER

CROSS REFERENCE TO RELATED APPLICATION(S)

This application is a continuation of International Patent Application No. PCT/JP2010/072875, which has an international filing date of Dec. 20, 2010, which designated the United States, and which claims priority to Japanese Patent Application No. 2009-296196 filed on Dec. 25, 2009, each of which are incorporated herein by reference in their entirety.

BACKGROUND OF THE INVENTION

1. Field of the Invention

This invention relates to a preform for a large container which is used for a large container made of a polyethylene terephthalate (hereinafter referred to as PET) resin and having a volume of 10 liters or more; the large container; and a method for producing the large container.

2. Description of the Related Art

Large containers made of a resin with a volume of, say, 5 gallons (about 20 liters) have so far been adopted worldwide, for example, as refillable bottles for mineral water. A polycarbonate resin is generally used as a material for such large containers.

Large containers, such as refillable bottles for mineral water, are usually recovered from consumers after their use. They are washed with a cleaning fluid at a temperature of the order of 65° C. (hot water washing), and reused a plurality of times. Thus, a polycarbonate resin excellent in heat resistance has been used preferably as a material for large containers.

In recent years, it has been confirmed that endocrine disrupting chemicals (EDCs) elute from containers made of polycarbonate resins. This has been perceived as a problem all over the world, and there has been a desire for the use of a resin material, which is unlikely to cause the elution of EDC, as a material for the above-mentioned large containers. For example, a PET resin used as a material for small containers for beverages poses no problem of EDC. Thus, the use of the PET resin as a material for large containers is under consideration.

However, a container made of the PET resin generally has low resistance to heat, thus posing the problem that the container deforms (shrinks) during washing with hot water as mentioned above. Under these circumstances, PET resin has not found wide use as a material for a large container which is used as a refillable bottle or the like for mineral water.

To solve the foregoing problems, the applicant of the present application, for example, has proposed a method for biaxially stretching an injection-molded preform by blow molding to produce a large container made of a PET resin, wherein the molded product is annealed at a higher temperature than the temperature of a cleaning fluid (see, for example, Patent Document 1).

With such a method, the heat resistance of the large container made of the PET resin is enhanced, whereby deformation of the large container during hot water washing can be suppressed. However, a further improvement in the heat resistance of the large container has been desired.

With a small container for a beverage, for example, there has been a proposal for a method for producing a container, which comprises primarily blow molding a preform to form a primary blow molded product larger than a final molded product, heat-treating the primary blow molded product to shrink it, and then secondarily blow molding the shrunken product to prepare the final molded product (see, for example, Patent Document 2).

PRIOR ART DOCUMENTS (Patent Document 1) JP-A-11-34152
(Patent Document 2) JP-A-3-205124

SUMMARY OF THE INVENTION

If a large container is produced by the method as described in Patent Document 2, however, it has been found that when the preform is subjected to stretch blow molding, the PET resin may undergo blushing, resulting in the loss of transparency which is the most characteristic of the PET resin.

In the production of a preform for a large container, moreover, even when a copolymer having a low rate of crystallization is used as a material, blushing due to spherulitization occurs, if the thickness of the preform is about 9 mm or more. This has limited the thickness to about 9 mm or less. Hence, there has been a limit to the amount of the PET resin which can be used as the material. This has constituted a hindrance, for example, to a desire for enhancing the rigidity of the large container with the use of a larger amount of the material.

The present invention has been accomplished in the light of the above-mentioned circumstances. It is an object of the present invention to provide a preform for a large container, which can enhance the heat resistance of the large container and can ensure satisfactory transparency thereof; the large container; and a method for producing the large container.

The present invention intended to solve the problems mentioned above lies in a preform for a large container, used for producing a large container which is made of a polyethylene terephthalate resin and which is formed by stretch blow molding, wherein the preform is formed by injecting molding to have a wall thickness of 6 mm to 9 mm and have a longitudinal axis length longer than that of the large container which is a final molded product.

A large container is produced with the use of the preform for a large container according to the present invention. By so doing, the stretch ratio of the preform in the longitudinal axis direction can be kept low, and the PET resin can be inhibited from blushing when crystallized upon stretching. Thus, a large container excellent in heat resistance as well as transparency can be produced.

The weight of the preform for a large container is preferably 550 g to 800 g. Hence, a large container, which can enhance heat resistance and transparency and has ensured sufficient rigidity, can be produced.

The present invention also lies in a large container produced using the above preform for a large container, characterized in that the large container has an open neck portion, a tubular trunk portion, a bottom portion sealing an end of the trunk portion, and a shoulder portion connecting the neck portion and the trunk portion, and the wall thickness of the shoulder portion is greater than the wall thickness of the trunk portion.

The large container of the present invention is excellent in heat resistance, so that its deformation due to hot water washing is suppressed. The large container also has satisfactory transparency, and thus can be used preferably, for example, as a refillable bottle for mineral water.

Furthermore, the present invention lies in a method for producing a large container, which comprises an injection step of injection molding a polyethylene terephthalate resin to form a preform having a longitudinal axis length longer than that of the large container which is a final molded product; an intermediate molding step of blow molding the preform to form a primary blow molded product having a size larger than that of the large container, heating the primary blow molded product, and shrinking the primary blow molded product to a size smaller than that of the large container to form an intermediate molded product; and a final molding step of blow molding the intermediate molded product within a final blow mold heated to a predetermined temperature to obtain the large container of a predetermined shape.

According to the present invention described above, in the intermediate molding step, the primary blow molded product is heated to promote the crystallization of the PET resin, and residual strain is removed during shrinkage of the primary molded product to form the intermediate molded product. Thus, the heat resistance of the large container, which is the final molded product, can be enhanced. Moreover, the provision of the injection step makes it possible to render low the stretch ratio of the preform in the longitudinal axis direction, and suppress the blushing of the stretched crystals of the PET resin occurring during this process. Hence, the large container with excellent heat resistance and transparency maintained satisfactorily can be produced.

Preferably, the intermediate molded product has an open neck portion, a tubular trunk portion, a bottom portion sealing an end of the trunk portion, and a shoulder portion connecting the neck portion and the trunk portion and having a wall thickness greater than the wall thickness of the trunk portion. In the intermediate molding step, it is preferred that when the primary blow molded product is heated, a shoulder portion of the primary blow molded product be heated at a temperature lower than that of the trunk portion. This measure suppresses the blushing of the PET resin due to spherulitization in the shoulder portion of a relatively large wall thickness, a phenomenon which occurs during annealing of the intermediate molded product. Thus, the transparency of the large container can be increased further, with its heat resistance being maintained satisfactorily.

In the intermediate molding step, moreover, it is preferred that when the primary blow molded product is heated, the temperature of the trunk portion be 140° C. to 180° C., and the temperature of the shoulder portion be 80° C. to 110° C. This measure suppresses the blushing of the PET resin due to spherulitization in the shoulder portion of a relatively large wall thickness, a phenomenon which occurs during annealing of the intermediate molded product.

The intermediate molding step includes, for example, a primary blow molding step of blow molding the preform within a primary blow mold held at room temperature to form the primary blow molded product; and a heat treatment step of bringing the primary blow molded product into contact with an inner wall surface of a heat treatment mold heated to a predetermined temperature to heat the primary blow molded product, and discharging a gas within the primary blow molded product, thereby shrinking the primary blow molded product to form the intermediate molded product.

Alternatively, in the intermediate molding step, for example, the preform is blow molded within a primary blow mold heated to a predetermined temperature to form the primary blow molded product; and the primary blow molded product is brought into contact with an inner wall surface of the primary blow mold, whereby the primary blow molded product is heated and a gas within the primary blow molded product is discharged to shrink the primary blow molded product, thereby forming the intermediate molded product.

In the intermediate molding step mentioned above, crystallization of the PET resin is promoted by heating the primary blow molded product, and residual strain is removed when the primary molded product is shrunken to form the intermediate molded product. Thus, the heat resistance of the large container which is the final molded product can be enhanced.

According to the present invention, as described above, the large container made of a PET resin can be increased in heat resistance and improved in transparency. Thus, it becomes possible to realize a large container which is preferably used, for example, as a large refillable bottle for mineral water with a volume of the order of 5 gallons (about 20 liters).

DESCRIPTION OF THE PREFERRED EMBODIMENT(S)

Figure 1:
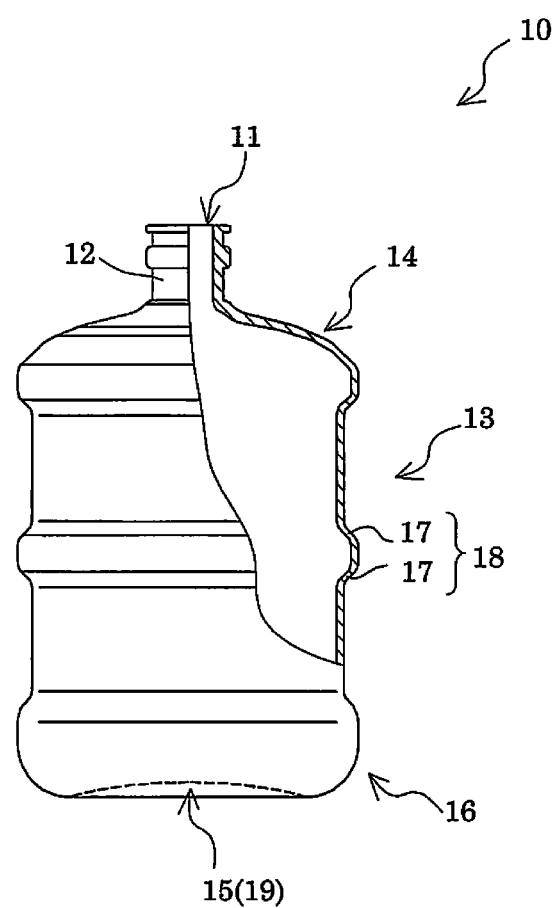
FIG. 1 is a partly sectional view of a large container according to an embodiment of the present invention.

An embodiment of the present invention will now be described with reference to the accompanying drawings. FIG. 1 is a partly sectional view of a large container according to the embodiment of the present invention.

A large container 10 shown in FIG. 1 is formed of a polyethylene terephthalate resin and used, for example, as a refillable bottle for mineral water with a volume of the order of 5 gallons (about 20 liters). This large container 10 has a mouth portion 11 at the upper end, and is composed of a neck portion 12 with an outer diameter of the order of, say, 55 mm, a tubular trunk portion 13 with a maximum diameter of the order of, say, 270 mm, a shoulder portion 14 connecting the neck portion 12 and the trunk portion 13 and gradually fanning out from the neck portion 12, a bottom portion 15 sealing an end of the trunk portion 13, and a heel portion 16 connecting the trunk portion 13 and the bottom portion 15.

A reinforcing portion 18 composed of a plurality of annular inclined portions 17 is formed in the trunk portion 13. A push-up bottom portion 19 protruding inwardly of the container is formed in the bottom portion 15. The reinforcing portion 18 and the push-up bottom portion 19 enhance the rigidity (buckling strength) of the large container 10, and prevent the trunk portion 13 or the bottom portion 15 from deforming when contents such as mineral water are placed in the large container 10.

In the present embodiment, moreover, the shoulder portion 14 of the large container 10 is formed with a larger wall thickness than that of the trunk portion 13. This also contributes to enhancing the rigidity of the large container 10. Such an increased wall thickness of the shoulder portion 14 results in a higher possibility for blushing of the PET resin occurring during the manufacturing process, but with the present invention, satisfactory transparency of the shoulder portion 14 can be ensured, as will be described later.

A method for producing the large container 10 according to the present invention stated above will be described below.

Figure 2:
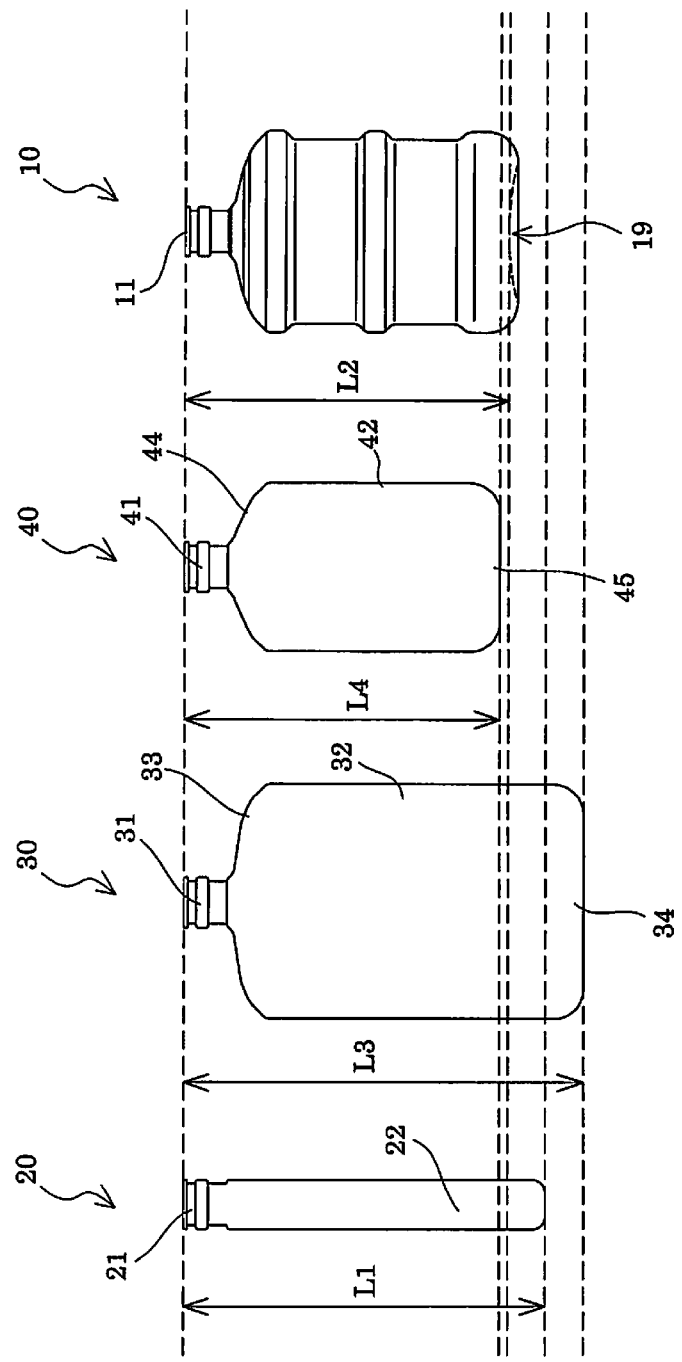
FIG. 2 is a schematic explanation drawing showing molded products obtained in the respective steps of a method for producing the large container according to the embodiment of the present invention.

As shown in FIG. 2, the large container 10 is molded via a preform 20 for a large container (hereinafter will be referred to simply as a preform 20), a primary blow molded product 30, and an intermediate molded product 40.

Figure 3:
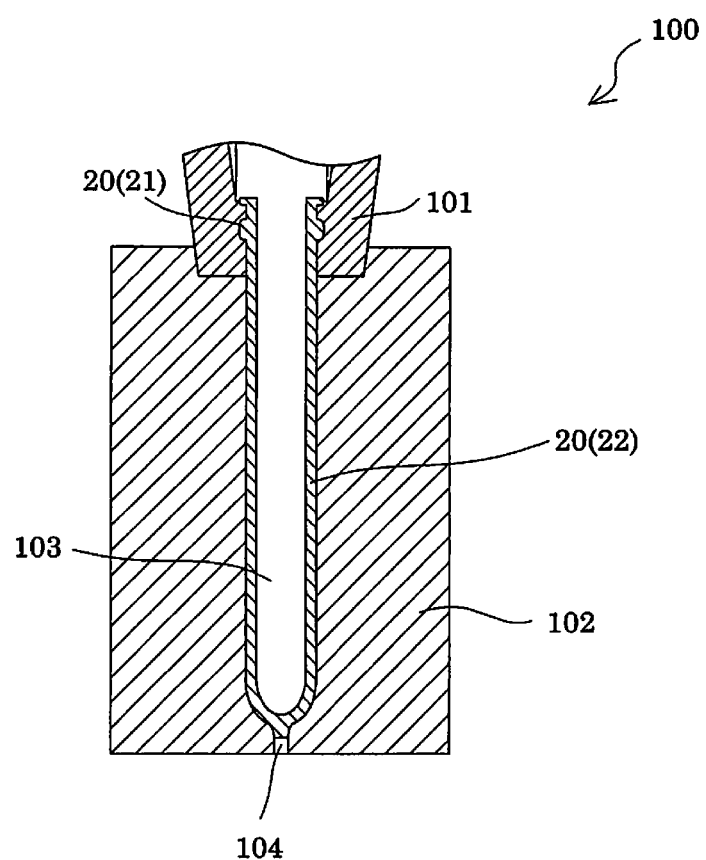
FIG. 3 is a schematic sectional view illustrating an injection step in the embodiment of the present invention.

As shown in FIG. 3, the preform 20 is formed by injection molding using an injection mold 100 (injection step). The preform 20 is a tubular body consisting of a neck portion 21 and a trunk portion 22 in the shape of a bottomed tube. It is formed such that its wall thickness is of the order of 6 mm to 9 mm and its longitudinal axis length L1 is longer than the longitudinal axis length L2 of the large container 10 which is a final molded product (see FIG. 2). The longitudinal axis length L2 of the large container 10 refers to the length of a central part of the large container 10 and, as shown in FIG. 2, means the length from the mouth portion 11 to the push-up bottom portion 19 of the large container 10.

As seen above, the preform 20 is formed to have the longitudinal axis length L1 longer than the longitudinal axis length L2 of the large container 10. As will be described in detail later, therefore, the heat resistance of the large container 10 produced by stretch blow molding of the preform 20 can be increased, and its transparency can be ensured satisfactorily.

Since the longitudinal axis length L1 of the preform 20 is longer than the longitudinal axis length L2 of the large container 10, moreover, the effect is obtained that satisfactory transparency of the large container 10 can be ensured, and its rigidity can be enhanced. By rendering the wall thickness of the preform 20 large, namely, by increasing the weight of the preform 20 (the amount of the PET resin used), the rigidity of the large container 10 can be enhanced. However, too large a wall thickness of the preform 20 would pose the problem of causing blushing associated with spherulitization during the production of the preform 20. With the present invention, by contrast, the longitudinal axis length L1 of the preform 20 is longer than the longitudinal axis length L2 of the large container 10, so that the wall thickness of the preform 20 can be limited to a value comparable to a conventional one (a value of the order of 6 mm to 9 mm) and the weight of the preform 20 can be increased.

For example, the weight of the preform for a conventional large container with a volume of the order of 5 gallons has been increased only to a value of the order of at most 650 g, if the wall thickness is taken into consideration. On the other hand, the preform 20 according to the present invention can have its weight increased to 700 g or more, and up to a value of the order of at most 800 g, upon consideration of its wall thickness. By producing the large container 10 with the use of the preform 20, therefore, the large container 10 having enhanced rigidity (buckling strength) while ensuring satisfactory transparency can be produced, without causing blushing of the PET resin associated with its crystallization.

Preferably, the weight of the preform 20 is of the order of 550 g to 800 g. Too light a weight of the preform 20 is not preferred, because it may fail in ensuring satisfactory rigidity (buckling strength) of the large container 10 which is the final molded product. Too heavy a weight, i.e., too large a wall thickness, of the preform 20 is also not preferred, because it is likely for blushing to occur due to stretching and crystallization of the PET resin or blushing associated with spherulitization to occur during blow molding, as mentioned earlier.

Furthermore, the weight of the conventional preform for a large container has been changeable only in a relatively narrow range of about 550 g to 650 g. The weight of the preform 20 according to the present invention, as mentioned above, can be changed in a considerably wide range of 550 g to 800 g. Thus, the present invention can produce wide varieties of large containers conformed to users' modes of use, ranging from containers with relatively low rigidity, but a very light weight to containers with a heavy weight, but extremely high rigidity. Even when the weight is rendered light, a longer preform than the large container 10 can be utilized. In this case, the preform 20 is thin-walled, and a possibility for blushing ascribed to spherulitization becomes lower. Thus, molding is stabilized, and the cooling time during injection molding can be shortened, so that the production cycle is also improved.

The longitudinal axis length L1 of the preform 20 may be set in a range in which it is longer than the longitudinal axis length L2 of the large container 10, but shorter than the longitudinal axis length L3 of the primary blow molded product 30 (see FIG. 2). Desirably, however, the longitudinal axis length L1 is rendered as long as possible within this range. For example, if the longitudinal axis length L3 of the primary blow molded product 30 is greater than the longitudinal axis length L2 of the large container 10 by a value of the order of 10%, it is preferred that the longitudinal axis length L1 of the preform 20 be also longer than the longitudinal axis length L2 of the large container 10 by a value of the order of 10%.

The injection mold 100 for molding the above preform 20 is composed of a neck mold 101 comprising a split mold which defines the outer wall surface of the neck portion 21 and which can be opened and closed in a horizontal direction; an injection cavity mold 102 which defines the outer wall surface of the trunk portion 22; and a core mold 103 which defines the inner wall surface of the preform 20. The PET resin is charged through a gate 104 on the central lower side of the injection cavity mold 102, and is injection-molded into the preform 20.

Figure 4:
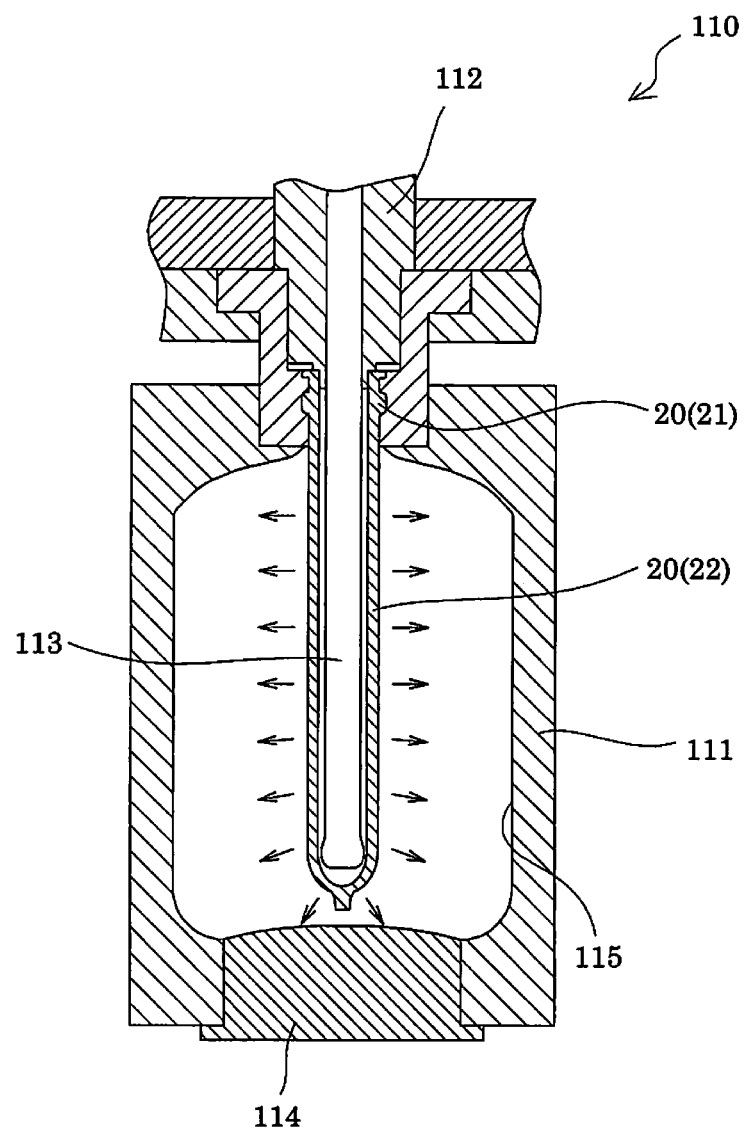
FIG. 4 is a schematic sectional view illustrating a primary blow molding step in the embodiment of the present invention.

The preform 20 is transported to a heating section (not shown), and heated to a predetermined temperature suitable for stretching. Then, the heated preform 20 is disposed inside a primary blow mold 110, as shown in FIG. 4. The blow molding of the preform 20 within the primary blow mold 110 results in the formation of a primary blow molded product 30 having a size larger than that of the large container 10 which is the final molded product (primary blow molding step).

The primary blow mold 110 is equipped with a primary blow split mold 111 which can be opened and closed, a blow core mold 112 into which the neck portion 21 of the preform 20 is inserted, a stretch rod 113 which can move upward and downward through the blow core mold 112, and a primary blow bottom mold 114. The primary blow mold 110 has an inner wall surface 115 conformed to the external shape of the primary blow molded product 30.

In the primary blow molding step, the preform 20 is stretched in a longitudinal axis direction by the stretch rod 113, and is also stretched in a transverse axis direction by high pressure air and pressed against the inner wall surface 115 of the primary blow mold 110, whereby the primary blow molded product 30 is molded. At this time, the primary blow mold 110 is not heated, but is maintained at room temperature. Thus, the primary blow molded product 30 withdrawn from the primary blow mold 110 assumes a shape conformed to the inner wall surface 115 of the primary blow mold 110.

In the primary blow molding step, as described above, the preform 20 is blow molded to form the primary blow molded product 30. However, before the primary blow molding step, there may be performed a so-called pre-blowing step in which the preform 20 is slightly stretched in its diametrical direction. By this step, the stretch ratio of the preform 20 in the primary blow molding step is kept low. Thus, the primary blow molded product 30 can be formed more satisfactorily.

The primary blow molded product 30 thus formed is composed of a neck portion 31 (21) molded in the injection step, a tubular trunk portion 32, a shoulder portion 33 connecting the trunk portion 32 and the neck portion 31, and a bottom portion 34 closing an end of the trunk portion 32, and has a size larger than that of the large container 10 which is the final molded product. The longitudinal axis length L3 including the neck portion 31 is longer than the longitudinal axis length L2 of the large container 10 (see FIG. 2).

Further, in performing the primary blow molding, it is preferred to adjust the stretching temperature of the preform 20, as appropriate, thereby rendering the wall thickness of the shoulder portion 33 of the primary blow molded product 30 larger than the wall thickness of the trunk portion 32. By this treatment, the stretch ratio of the shoulder portion 33 can be kept low, and blushing of the PET resin in the shoulder portion 33 associated with stretching and crystallization can be suppressed more reliably. Since a relatively large wall thickness can be ensured for the shoulder portion 33, moreover, the rigidity of the large container 10 as the final molded product can be enhanced.

Figure 5:
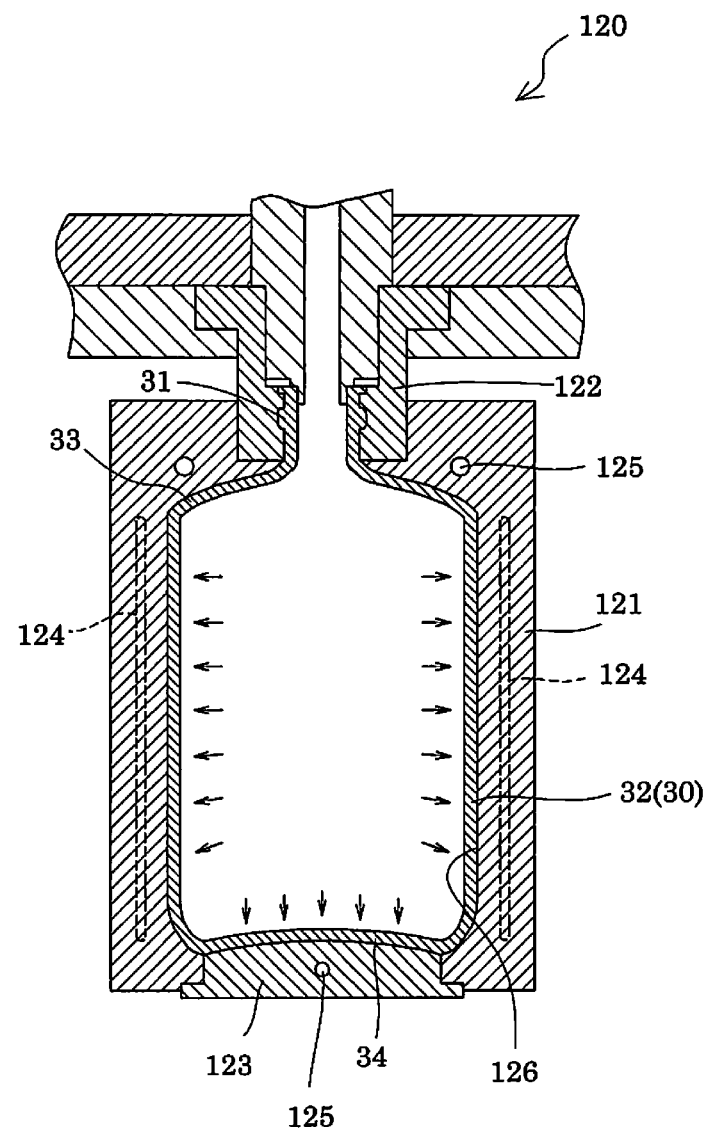
FIG. 5 is a schematic sectional view illustrating a heat treatment step in the embodiment of the present invention.

Then, as shown in FIG. 5, the primary blow molded product 30 cooled to room temperature is disposed within a heat treating blow mold 120, and heat-treated therein, whereafter the primary blow molded product 30 is shrunken to a size smaller than that of the large container 10 to form an intermediate molded product 40 (heat treatment step). After the primary blow molded product 30 is cooled to room temperature, the primary blow molded product 30 may be immediately subjected to the heat treatment step. Actually, however, the injection step and primary blow molding step mentioned above are repeated to produce a plurality of the primary blow molded products 30 at a time, and then these plural primary blow molded products 30 are subjected to the heat treatment step.

The heat treating blow mold 120 is composed of a heat treatment mold 121 comprising a split mold accommodating the primary blow molded product 30, a heat treating core mold 122 into which the neck portion 31 of the primary blow molded product 30 is inserted, and a push-up bottom heating mold 123 corresponding to the bottom portion 34 of the primary blow molded product 30. The molding space of the heat treatment mold 121 has nearly the same shape as the external shape of the primary blow molded product 30. The heat treatment mold 121 is provided with a plurality of, for example, 12 rod-shaped heaters 124 in a part corresponding to the trunk portion 32 of the primary blow molded product 30. These heaters 124 are built in at nearly equal intervals around the molding space of the heat treatment mold 121, and the trunk portion 32 of the primary blow molded product 30 is heated to a predetermined temperature by these heaters 124.

In the heat treatment mold 121, a supply path 125 supplied with a temperature control medium such as a heated oil is formed in a part corresponding to the shoulder portion 33 of the primary blow molded product 30. Because of this configuration, the trunk portion 32 and the shoulder portion 33 of the primary blow molded product 30 can be heated to different temperatures by the heat treatment mold 121. The heat treating core mold 122 is configured to be capable of supplying and discharging air from its front end.

The heat treating blow mold 120 is preheated to a predetermined temperature. In the heat treatment step, high pressure air is fed into the primary blow molded product 30, and the primary blow molded product 30 is kept in contact with the inner wall surface 126 of the heat treatment mold 121 for a predetermined period of time to perform heat treatment (heat setting treatment). Then, the gas within the primary blow molded product 30 is discharged, and the primary blow molded product 30 is withdrawn from the heat treatment mold 121 to form the intermediate molded product 40. That is, when the gas within the primary blow molded product 30 is discharged, and the primary blow molded product 30 is withdrawn from the heat treatment mold 121, the primary blow molded product 30 shrinks to become the intermediate molded product 40 having the longitudinal axis length L3 shorter than the longitudinal axis length L2 of the large container 10 which is the final molded product.

In the heat treatment step, it is preferred that at least the trunk portion 32 of the primary blow molded product 30 be heated at a temperature higher than the heating temperature in a final molding step to be described later, for example, at 140° C. to 180° C. In the present embodiment, for example, the heating temperature of the heat treatment mold 121 by the plurality of heaters 124 is set at 140° C. to 180° C., for example. The heat treating (heat setting) time in this case is preferably set to be between 8 s to 16 s. By so doing, the residual stress of the primary blow molded product 30 is removed, and the heat resistance of the large container 10 which is the final molded product is enhanced.

When the shoulder portion 33 of the primary blow molded product 30 is formed with a larger wall thickness than that of the trunk portion 32, as stated above, there is a possibility that blushing of the PET resin associated with spherulitization will occur during cooling, if the shoulder portion 33 is heated at a temperature comparable to that for the trunk portion 32 in the heat treatment step. Thus, it is preferred that the shoulder portion 33 be heated at a temperature lower than that of the trunk portion 32, for example, at a temperature of 80° C. to 110° C. In the present embodiment, the temperature control medium is supplied into the supply path 125 of the heat treatment mold 121, whereby the shoulder portion 33 is heated at a temperature of 80° C. to 110° C. By this procedure, the blushing of the PET resin associated with spherulitization in the relatively thick-walled shoulder portion 33 can be suppressed. For the same reason, it is preferred in the heat treatment step that the bottom portion 34 of the primary blow molded product 30 also be heated at a relatively low temperature by a temperature control medium.

The so formed intermediate molded product 40 is formed in a size smaller than that of the large container 10 which is the final molded product. This product 40 is composed of a neck portion 41, a tubular trunk portion 42, a shoulder portion 44 connecting the trunk portion 42 and the neck portion 41, and a bottom portion 45 closing an end of the trunk portion 42. A longitudinal axis length L4 including the neck portion 41 is also shorter than the longitudinal axis length L2 of the large container 10 (see FIG. 2).

Figure 6:
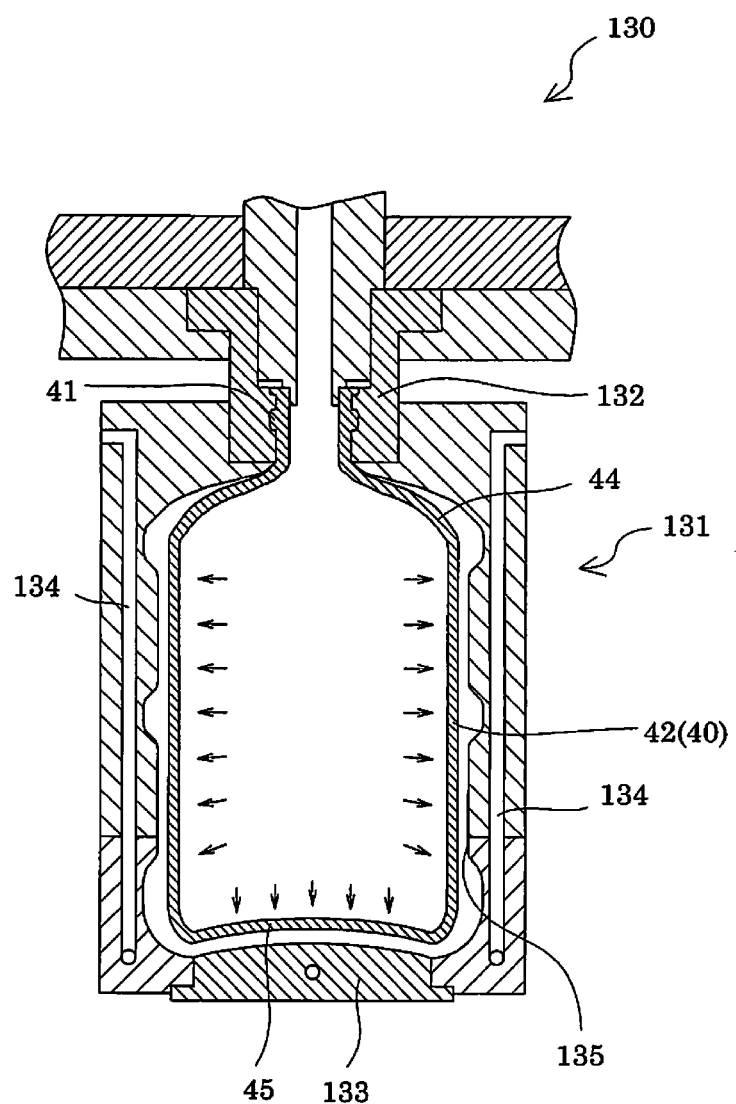
FIG. 6 is a schematic sectional view illustrating a final molding step in the embodiment of the present invention.

Then, this intermediate molded product 40 is disposed within a final blow mold 130 heated to a predetermined temperature, as shown in FIG. 6. The intermediate molded product 40 is blow molded within the final blow mold 130 to obtain the large container 10 which is the final molded product (see FIG. 2).

The final blow mold 130 is equipped with a final blow split mold 131 accommodating the intermediate molded product 40 and divided in two in a vertical direction; a final treatment core mold 132 into which the neck portion 41 of the intermediate molded product 40 is inserted; and a push-up bottom mold 133 corresponding to the bottom portion 45 of the intermediate molded product 40. Around the molding space of the final blow split mold 131, a plurality of supply paths 134 supplied with a temperature control medium are provided along the longitudinal axis direction. The intermediate molded product 40 within the molding space is heated to the predetermined temperature by the temperature control medium circulating in these plural supply paths 134.

In the final molding step, the intermediate molded product 40 disposed within the final blow mold 130 is stretched in the longitudinal axis direction and the transverse axis direction by high pressure air supplied to its interior, and is pressed against the inner wall surface 135 of the final blow split mold 131 for heat treatment, whereby the large container 10 which is the final molded product is molded (see FIG. 1). Concretely, the final blow mold 130 is preheated to a predetermined temperature, for example, 80° C. to 110° C. At this temperature, the intermediate molded product 40 is heat-set for a predetermined time, for example, 25 s to 30 s, whereby the large container 10 is formed.

The large container comprising the PET resin is produced by the methods described above. In this manner, the large container excellent in heat resistance and increased in transparency can be realized. In the primary blow molding step, the primary blow molded product is heated to promote the crystallization of the PET resin. In the heat treatment step, the primary molded product is shrunken to form the intermediate molded product. On this occasion, residual strain is removed. Thus, the heat resistance of the large container which is the final molded product can be enhanced.

Moreover, the longitudinal axis length of the preform is rendered longer than that of the large container which is the final molded product. As a result, the stretch ratio of the preform in the primary blow molding step is kept low, and the blushing of the PET resin upon stretching and crystallization which otherwise occurs can be suppressed. Furthermore, since the longitudinal axis length of the preform is longer than that of the large container, the weight of the preform can be increased markedly to enhance the rigidity of the large container. In the present embodiment, in particular, the intermediate molded product 40 is heat-set in the final molding step as well as in the intermediate molding step. Thus, the rigidity of the large container 10 which is the final molded product can be reliably improved.

Thus, the large container 10 having excellent heat resistance and maintaining transparency satisfactorily can be realized. In comparison with a conventional large container formed by single blow molding, for example, heat resistance can be improved markedly, and transparency comparable to or better than that of the conventional large container is obtained. For example, the large container 10 does not deform (shrink) even when washed a plurality of times (20 times or so) with alkaline hot water at 60° C. to 70° C., and can be substantially prevented from cracking. Hence, the large container 10 can be used preferably for applications requiring hot water washing, such as refillable bottles for mineral water.

The embodiment of the present invention has been described above. However, it goes without saying that the present invention may be changed or modified variously, without departing from its gist.

In the foregoing embodiment, for example, an explanation has been offered for the example in which the intermediate molding step of forming the primary blow molded product and converting this primary blow molded product into the intermediate molded product includes the primary blow molding step and the heat treatment step. However, the intermediate molding step is not limited to this example. For example, the intermediate molding step may be performed in a manner in which the primary blow molding step and the heat treatment step are carried out substantially simultaneously. For example, the following procedure may be carried out: The preform is disposed inside the aforementioned heat treating blow mold 120 or the like, and the preform is blow molded within this heat treating blow mold preheated to a predetermined temperature to form a primary blow molded product. This primary blow molded product is brought into contact with the inner wall surface of the heat treating blow mold, and thereby heat-treated (heat-set). Even in this case, the gas within the primary blow molded product is subsequently discharged, and the primary blow molded product is withdrawn from inside the heat treating blow mold. As a result, the primary blow molded product shrinks to become the intermediate molded product.

EXPLANATIONS OF LETTERS OR NUMERALS

10 Large container
11 Mouth portion
12 Neck portion
13 Trunk portion
14 Shoulder portion
15 Bottom portion
16 Heel portion
17 Inclined portion
18 Reinforcing portion
19 Push-up bottom portion
20 Preform
21 Neck portion
22 Trunk portion
30 Primary blow molded product
31 Neck portion
32 Trunk portion
33 Shoulder portion
34 Bottom portion
40 Intermediate molded product
41 Neck portion
42 Trunk portion
44 Shoulder portion
45 Bottom portion Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A method for producing a large container, comprising:
   an injection step of injection molding a polyethylene terephthalate resin to form an oversize preform having a longitudinal axis length longer than that of the large container which is a final molded product;
   an intermediate molding step of blow molding the oversize preform that has a length longer than that of the large container which is a final molded product to form a primary blow molded product having a diameter larger than and a longitudinal axis length longer than those of the large container, and heating and shrinking the primary blow molded product to form an intermediate molded product having a diameter smaller than and a longitudinal axis length shorter than those of the large container; and
   a final molding step of blow molding the intermediate molded product within a final blow mold heated to a predetermined temperature to obtain the large container of a predetermined shape.

2. The method for producing a large container according to claim 1, wherein
the intermediate molded product has an open neck portion, a tubular trunk portion, a bottom portion sealing an end of the trunk portion, and a shoulder portion connecting the neck portion and the trunk portion and having a wall thickness greater than that of the trunk portion, and
in the intermediate molding step, when the primary blow molded product is heated, a shoulder portion of the primary blow molded product is heated at a temperature lower than that of the trunk portion.

3. The method for producing a large container according to claim 2, wherein
in the intermediate molding step, when the primary blow molded product is heated, the temperature of the trunk portion is 140° C. to 180° C., and the temperature of the shoulder portion is 80° C. to 110° C.

4. The method for producing a large container according to claim 1, wherein
the intermediate molding step includes
a primary blow molding step of blow molding the oversize preform within a primary blow mold held at room temperature to form the primary blow molded product; and
a heat treatment step of bringing the primary blow molded product into contact with an inner wall surface of a heat treatment mold heated to a predetermined temperature to heat the primary blow molded product, and discharging a gas within the primary blow molded product, thereby shrinking the primary blow molded product to form the intermediate molded product.

5. The method for producing a large container according to claim 2, wherein
the intermediate molding step includes
a primary blow molding step of blow molding the oversize preform within a primary blow mold held at room temperature to form the primary blow molded product; and
a heat treatment step of bringing the primary blow molded product into contact with an inner wall surface of a heat treatment mold heated to a predetermined temperature to heat the primary blow molded product, and discharging a gas within the primary blow molded product, thereby shrinking the primary blow molded product to form the intermediate molded product.

6. The method for producing a large container according to claim 3, wherein
the intermediate molding step includes
a primary blow molding step of blow molding the oversize preform within a primary blow mold held at room temperature to form the primary blow molded product; and
a heat treatment step of bringing the primary blow molded product into contact with an inner wall surface of a heat treatment mold heated to a predetermined temperature to heat the primary blow molded product, and discharging a gas within the primary blow molded product, thereby shrinking the primary blow molded product to form the intermediate molded product.

7. The method for producing a large container according to claim 1, wherein
in the intermediate molding step
the oversize preform is blow molded within a primary blow mold heated to a predetermined temperature to form the primary blow molded product, and
the primary blow molded product is brought into contact with an inner wall surface of the primary blow mold, whereby the primary blow molded product is heated and a gas within the primary blow molded product is discharged to shrink the primary blow molded product, thereby forming the intermediate molded product.

8. The method for producing a large container according to claim 2, wherein
in the intermediate molding step
the oversize preform is blow molded within a primary blow mold heated to a predetermined temperature to form the primary blow molded product, and
the primary blow molded product is brought into contact with an inner wall surface of the primary blow mold, whereby the primary blow molded product is heated and a gas within the primary blow molded product is discharged to shrink the primary blow molded product, thereby forming the intermediate molded product.

9. The method for producing a large container according to claim 3, wherein
in the intermediate molding step
the oversize preform is blow molded within a primary blow mold heated to a predetermined temperature to form the primary blow molded product, and
the primary blow molded product is brought into contact with an inner wall surface of the primary blow mold, whereby the primary blow molded product is heated and a gas within the primary blow molded product is discharged to shrink the primary blow molded product, thereby forming the intermediate molded product.

10. A method for producing a large container, comprising:
an injection step of injection molding a polyethylene terephthalate resin to form a preform having a longitudinal axis length L1 that is longer than the length L2 of the large container which is a final molded product;
an intermediate molding step of,
without shrinking the preform below the length L2, blow molding the preform of length L1 to form a primary blow molded product having a diameter larger than and a longitudinal axis length L4 that are longer than those of both the large container and the preform, and subsequently heating and shrinking the primary blow molded product of length L4 to form an intermediate molded product having a diameter smaller than and a longitudinal axis length L3 shorter than those of the large container; and
a final molding step of blow molding the intermediate molded product within a final blow mold heated to a predetermined temperature to obtain the large container of a predetermined shape and length L2.

11. The method of claim 10, wherein the large container holds at least 10 liters of fluid.

12. The method of claim 10, wherein the large container holds at least 20 liters of fluid.

13. The method of claim 10, wherein the preform has a weight between 550 grams and 800 grams.

* * * * *